A. L. WRIGHT.
GAGE TUBE PROTECTOR AND ILLUMINATOR.
APPLICATION FILED OCT. 28, 1920.
1,401,574.
Patented Dec. 27, 1921.
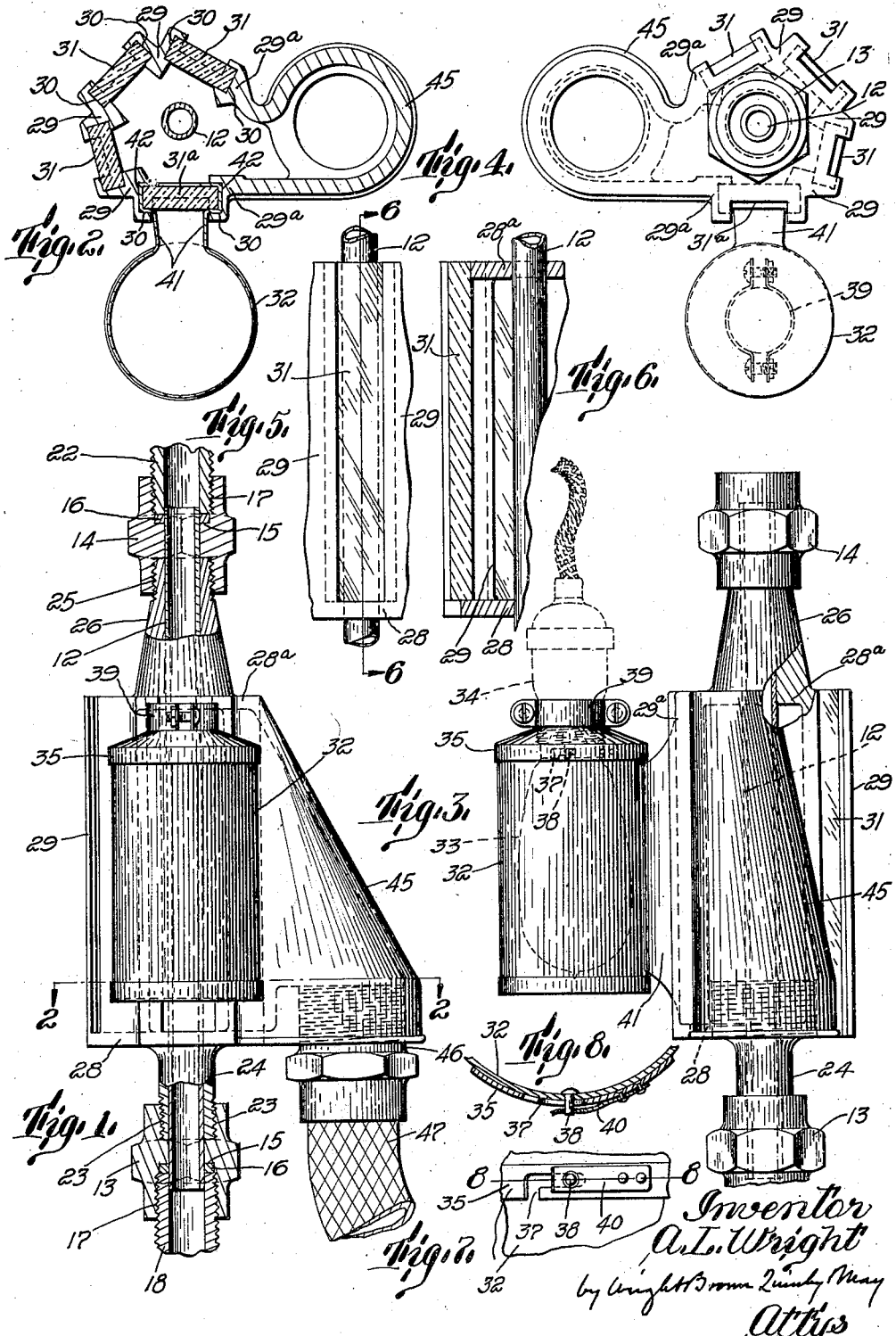

UNITED STATES PATENT OFFICE.

ASHLEY L. WRIGHT, OF NEWTON, MASSACHUSETTS.

GAGE-TUBE PROTECTOR AND ILLUMINATOR.

1,401,574.  Specification of Letters Patent.  Patented Dec. 27, 1921.

Application filed October 28, 1920. Serial No. 420,253.

*To all whom it may concern:*

Be it known that I, ASHLEY L. WRIGHT, a citizen of the United States, residing at Newton, in the county of Middlesex and State of Massachusetts, have invented new and useful Improvements in Gage-Tube Protectors and Illuminators, of which the following is a specification.

This invention relates to a gage-tube located in the cab of a locomotive, and connected at its opposite ends with the water and steam spaces of the boiler, and to an attachment adapted to illuminate the gage-tube, so that it may be clearly seen at night, and to inclose the tube so that, in the event of breakage of the tube, the occupants of the cab will be protected against steam and hot water, the attachment including a cage surrounding the gage-tube, and glass plates or prisms filling openings in the cage, and permitting the entrance of artificial light into the cage, and inspection of the gage tube by the engineer and fireman.

The invention is embodied in the improvements which I will now proceed to describe and claim.

Of the accompanying drawings forming a part of this specification,—

Figure 1 is a side elevation of an attachment embodying the invention.

Fig. 2 is a section on line 2—2 of Fig. 1.

Fig. 3 is a side elevation taken from a different point.

Fig. 4 is a bottom plan view.

Fig. 5 is a fragmentary side view.

Fig. 6 is a section on line 6—6 of Fig. 5.

Fig. 7 is an enlargement of a portion of Fig. 3.

Fig. 8 is a section on line 8—8 of Fig. 7.

The same reference characters indicate the same parts in all of the figures.

In the drawings, 12 represents the usual vertical glass gage-tube, communicating at its lower end with the water space, and at its upper end with the steam space of a locomotive boiler, and located in the cab adjacent to the rear end of the boiler.

The usual connections between the tube and the boiler include the tubular lower and upper couplings 13 and 14, shown in section by Fig. 1, each receiving an end portion of the tube 12, and each having a seat 15 for an elastic gasket 16, surrounding and compressed against the tube. The lower coupling 13 has an internally threaded portion 17, engaging an external thread on a nipple or fitting 18, communicating with the water space of the boiler, the gasket 16 of this coupling being compressed between the fitting 18 and the seat 15, and thus caused to form a tight joint around the tube 12.

The upper coupling 14 is constructed like the lower coupling 13, its internally threaded portion 17 being adapted to engage the lower end portion of a nipple 22, which communicates with the steam space of the boiler and is adapted to be screwed upward to detach it from the coupling 14, and downward to engage it with said coupling.

The construction above described is well known, and is described thus fully to make clear the manner of installing and removing my improved attachment hereinafter described.

The lower coupling 13 is provided with an internally threaded portion 23, adapted to engage an externally threaded nipple 24. The upper coupling 14 is provided with an internally threaded portion 25, adapted to engage an externally threaded nipple 26.

Said nipples 25 and 26 are located at opposite ends of a cage adapted to surround the portion of the tube 12, between the couplings 13 and 14, said cage having sight openings permitting observation of the tube from different points in the cab, and thick plates of glass known as prisms, inserted in said openings, to permit observation of the tube, and to prevent damage from steam and water in the event of breakage of the tube. The cage is also provided with a holder for a tube illuminator, such as an incandescent electric lamp, arranged to illuminate the tube without projecting glaring or direct light rays into the eyes of the engineer and fireman.

The cage and the nipples 24 and 26 are preferably formed in one piece as a metal casting. The lower and upper ends of the cage are formed by heads 28 and 28$^a$, which are joined to the nipples 24 and 26, and are apertured to receive the tube 12, a portion of the upper head 28$^a$ being shown in section, and the lower head 28 being shown by dotted lines by Fig. 3. Portions of both heads are shown in section by Fig. 6.

The intermediate portion of the cage is formed by vertical bars 29 and 29$^a$, which are joined to the upper and lower heads 28$^a$ and 28, and are spaced apart, as shown by Fig. 2, to form sight openings. The opposed edges of said bars are provided with grooves 30, forming guides for thick glass prisms 31, constituting fillers for said openings. The said openings and guides extend through the upper head 28ª, so that the upper ends of the openings and guides are open and unobstructed. The prisms are, therefore, adapted to slide vertically into and out of the openings and guides. The lower head 28 is formed to obstruct the lower ends of the openings and guides, and form stops adapted to support the prisms in their operative positions, as shown by Figs. 5 and 6.

It will be seen by reference to Fig. 2, that the cage bars 29 and 29ª are grouped around the tube 12, so that the tube may be viewed from different sides of the cage.

32 represents a casing, preferably of sheet metal, and of cylindrical form, provided with means for holding an illuminator, such as an incandescent electric lamp, the bulb 33 and socket 34 of which are shown by dotted lines in Fig. 3. I have embodied said holding means in a head 35, detachably secured to the casing by a bayonet joint connection 37, 38, (Figs. 7 and 8), the head being provided with a clamp 39 embracing the lamp socket 34. A spring catch 40 is provided to engage the connection member 38. Said head and clamp constitute a holder adapted to hold a lamp-socket projecting from one end of the lamp casing.

The casing 32 is formed with an open neck 41, formed to permit light rays to pass from the casing. Said neck is provided with angular flanges 42, formed to enter two of the grooves or guides 30, and to receive a prism 31ª. Said flanges and prism constitute a filler for one of the openings, said filler being slidable vertically into and out of the opening, and supported in its operative position by the stop at the lower end of said opening. Provision is therefore made for detachably connecting the casing 32, and a prism 31ª associated therewith, with the cage, the prism protecting one of the openings in the cage, and permitting light rays from the lamp to enter the cage. The casing 32 may be inverted from the position shown by Fig. 3, so that the lamp socket 34 may project downward instead of upward, in case the space above the casing is obstructed by a throttle lever or other part of the locomotive.

It will be seen that the flange 42 on the hollow light-transmitting neck 41 of the lamp casing, and the prism 31ª engaged with said flanges, constitute a member which serves both as a light-transmitting protective filler for one of the openings in the cage, and as a runner which is movable in the guides 29ª, to permit the application and removal of the lamp casing, and is adapted to abut against the stop at the lower end of said opening and support the lamp casing in its operative position.

As shown by Fig. 2, the arrangement is such that the light rays from the lamp impinge directly on the tube 12, but are prevented by the cage bars and the prisms 31 from passing undeflected through the cage and affecting the vision of occupants of the cab. The cage is provided with a hood or conduit portion 45, joined to the cage bars 29ª, as shown by Fig. 2, and having a tapped orifice at its lower end for engagement with a nipple 46, attached to one end of a flexible drain pipe 47, provision being thus made for conducting water and steam from the casing in the event of breakage of the tube 12.

The cage may be installed in operative relation to the gage tube 12, by screwing the nipple 24 into the lower coupling 13, screwing the latter upon the usual fixed nipple 18, screwing the upper coupling 14 on to the upper nipple 26, and then screwing the nipple 22 into the coupling 14, the nipple 22 constituting a vertically adjustable member of the connection between the gage tube and the steam space of the boiler, and the nipples 18 and 22 constituting fittings in common use for securing the gage tube in its operative position.

The openings containing the prisms 31 constitute sight openings, and the opening containing the flanges 42 and prism 31ª constitutes a light-transmitting opening. It is obvious that the number of sight-openings may be varied, three being the preferred number.

It will be seen that each of the opening fillers is slidable vertically to and from its operative position, and is retained by gravity in said position against a stop at the lower end of the cage. Provision is therefore made for quickly and conveniently removing and replacing either of said fillers, removal being necessary to permit the cleansing of the inner side of a filler. Provision is also made for inserting the filler formed by the prism 31ª and flanges 42, with either end uppermost, so that the socket 34 may project either upward or downward.

I claim:

1. A gage tube protector and illuminator comprising a cage formed to surround the indicating portion of a vertical gage tube, and provided at one side with a light-conducting opening having vertical guides at its opposite edges, and with a stop at the lower end of said opening; and a lamp casing having a hollow light-conducting neck provided with a light-transmitting protective filler, which includes a glass prism, and angular flanges at opposite sides of said neck, embracing edge portions of the prism, said filler being engaged with said guides, and adapted to abut against said stop to support the lamp casing in its operative position, the filler constituting also a slidable runner which permits the application and removal of the lamp casing, other sides of the cage being provided with sight openings and with protective prisms therefor.

2. A gage tube protector and illuminator comprising a cage formed to surround the indicating portion of a vertical gage tube, and provided at one side with a light-conducting opening having vertical guides at its opposite edges, and with a stop at the lower end of said opening; and a lamp casing having at one end a holder for an electric-lamp socket, and at one side a light-conducting hollow neck, provided with a light-transmitting protective filler which includes a glass prism and prism-holding means, and is engaged with said guides, and adapted to abut against said stop to support the lamp casing in its operative position, said filler constituting also a slidable runner which permits the application and removal of the lamp casing, and is invertible in said opening, to permit a lamp socket engaged with said holder to project either upward or downward, other sides of the cage being provided with sight-openings and with protective prisms therefor.

In testimony whereof I have affixed my signature.

ASHLEY L. WRIGHT.